March 6, 1928.

A. J. EASON 1,661,691

BLOWPIPE GAS FLOW CONTROL

Filed May 22, 1926

Inventor
Andrew J. Eason
by Hazard and Miller
Attorneys

Patented Mar. 6, 1928.

1,661,691

UNITED STATES PATENT OFFICE.

ANDREW J. EASON, OF SAN BERNARDINO, CALIFORNIA, ASSIGNOR OF ONE-HALF TO ULAH J. W. WEST, OF SAN BERNARDINO, CALIFORNIA.

BLOWPIPE GAS-FLOW CONTROL.

Application filed May 22, 1926. Serial No. 110,849.

This invention relates to improvements in blow pipes or torches, such as are commonly used in acetylene welding and heating.

In the conventional forms of prior constructions there are two conduits which lead from sources of gas supply to the blow pipe and serve to convey a fuel and oxygen to the blow pipe. Usually, these conduits are provided with valves which are in the form of needle valves and which have fine threads permitting a fine adjustment of the quantities of gas flowing through their respective conduits. Because of the fine threads employed considerable time is required to completely shut off these valves and to open them. Consequently, when there is a back fire or when the workman should desire to shut off his torch or blow pipe for a short time, considerable time is required to turn off both of the valves, causing not only a waste of time, but also a waste of gases flowing through the conduits. On again opening the valves a similar amount of time and gases is wasted before the correct adjustment is obtained.

An object of this invention is to provide an improved blow pipe, wherein there are quickly movable valves in each of the conduits which are associated with the valves conventionally employed, enabling the workman to quickly close or open the conduits without operating the adjusting valves conventionally employed, thus enabling the workman to open and close the conduits quickly, leaving the conventional valves stationary in their adjusted position.

Another object of this invention is to provide a construction whereby the quick-throw valves can be operated simultaneously by a single member to open and close their respective conduits.

Figure 1:
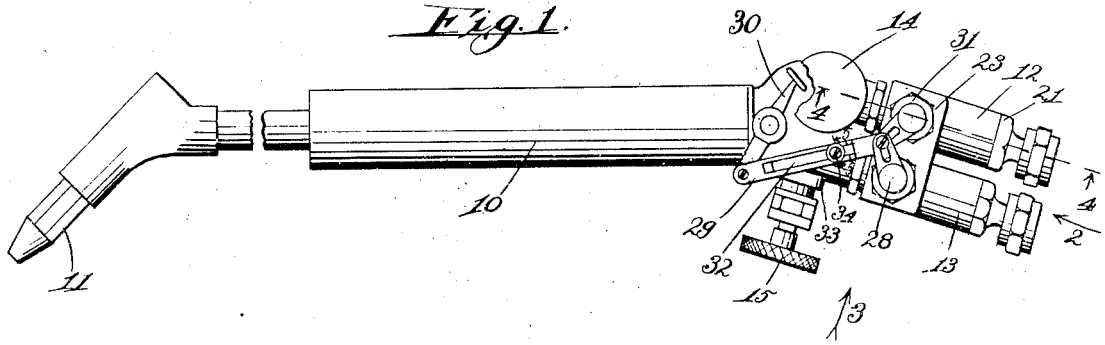
Figure 2:
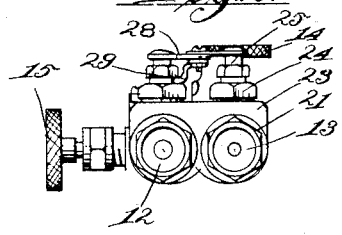
Figure 3:
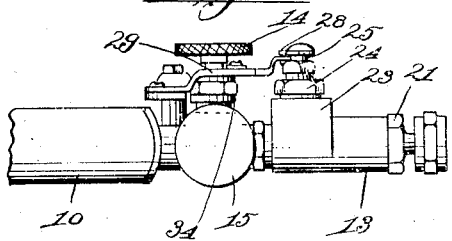
Figure 4:
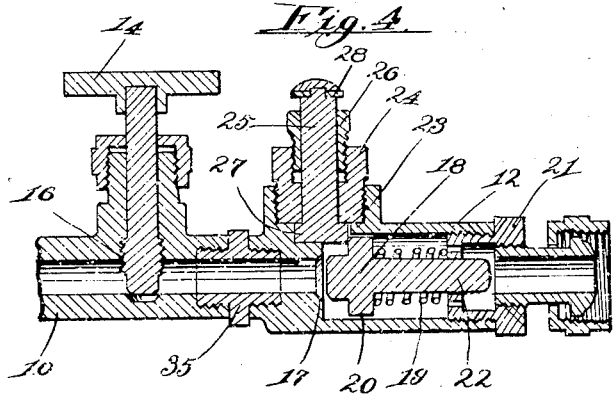
Figure 5:

With the foregoing and other objects in view which will be made manifest in the following detailed description and specifically pointed out in the appended claims, reference is had to the accompanying drawings for an illustrative embodiment of the invention, wherein:

Figure 1 is a side elevation of a blow pipe embodying the invention,

Fig. 2 is an end elevation of the same taken in the direction of the arrow 2 upon Fig. 1, Fig. 3 is a partial side elevation taken in the direction of the arrow 3 upon Fig. 1, Fig. 4 is a sectional view taken on the line 4—4 of Fig. 1, and Fig. 5 is a sectional view through the connecting link illustrating its details of construction.

Referring to the accompanying drawings wherein similar reference characters designate similar parts throughout, the body of the improved blow pipe is indicated at 10 and is provided with a tip 11. Two conduits 12 and 13 lead to the body of the blow pipe and in each of these conduits there are the conventional needle valves, indicated respectively at 14 and 15. These needle valves are threaded with fine threads indicated at 16 upon Fig. 4, permitting a fine adjustment, but at the same time being disadvantageous in that considerable time is required to completely close these valves or to open them. The invention consists of providing in the conduits seats 17 for valve closures 18 which are urged into seating position by coil springs 19. The coil springs 19 are compressed between flanges 20 on the valve closures which have grooves on their peripheral surfaces and between the bodies 21 of couplings, serving to connect the blow pipe to hose leading from sources of gas supply. The valve closures 18 have stems 22 which are slidable in the bodies 21 of the couplings.

Upon the conduits there are formed internally threaded nipples 23 which receive stuffing boxes 24. Valve stems 25 extend through the stuffing boxes and a tight joint is maintained about them by means of packing nuts 26 which compress packing in the stuffing boxes about the stems 25. The lower end of each stem is provided with a cam 27 which is engageable upon the flange 20 of each valve closure 18, so that upon rotation of the stem 25, the valve closure 18 associated with it may be moved into seating position or be unseated. The top of each stem 25 has mounted thereon a slotted arm 28, and a link 29 pivotally connected to a lever 30 which is pivoted on the body of the blow pipe has a pin 31 extending through the slots of both of the arms 28. The link 29 is formed of two pieces 32 and 33. The piece 32 has a groove formed in it which is dove-tailed in cross section and the piece 33 slidably fits within this groove. The piece 33 also has a slot through which the screw 34 extends. This construction provides for an adjustment of the link 29 as to its length.

The operation of the improved blow pipe is as follows: In using the blow pipe the valves 14 and 15 are adjusted to permit the conduits to convey the proper amount of gases to the tip 11. In the event of a back fire or in the event that the workman should wish to lay down his blow pipe for a short time, it is merely necessary to swing the top of the lever 30 forwardly. This swings the link 29 backwardly and causes both valve stems 25 to rotate, thus rotating the cams 27 and permitting the valve closures 18 to be seated by the springs 19, effectively cutting off the flow of gases through the conduits. When the workman wishes to resume work, he merely swings the upper end of the lever 30 backwardly, causing both of the closures 18 to be unseated and permitting the gases to flow through the conduits as before. By this arrangement it will be appreciated that it is not necessary to touch the valves 14 or 15, and that these valves can be allowed to remain in their adjusted positions. In view of the fact that the valve closures 18 are quickly operable, a considerable amount of time and gases are saved, which would otherwise be consumed on completely closing and opening both of the valves 14 and 15.

If desired, the improved construction may be made in the form of an attachment, in which the conduit in which the valve closures 18 are disposed is in the form of a barrel adapted to be attached to the blow pipe by means of a coupling 35, which has both right and left hand threads, permitting the barrel to be firmly secured to the blow pipe.

From the above described construction it will be appreciated that a novel and efficient blow pipe is used which is designed to overcome many disadvantages which occur in using the conventional blow pipe.

It is to be noted that a characteristic feature of my invention is that both of the valves in the conduits 12 and 13 are simultaneously controlled and may be positively opened or positively closed without the necessity of holding the lever 30, therefore, when these valves are open the operator may release his hand from engaging the said lever 30 and may clasp the work being operated on and the workman may engage the blow pipe nearer the tip in order to guide same more accurately in the work undertaken. My invention distinguishes from other devices in which it is necessary for the operator to continuously hold the valve mechanism to retain it in the desired position.

It will be understood that various changes may be made in the detail of construction without departing from the spirit or scope of the invention as defined by the appended claims.

I claim:

1. A blow pipe having two gas conduits, valves mounted in the conduits, each of the valves having a rotatable stem on which there is a slotted arm, a lever pivoted upon the blow pipe, and a link pivoted to the lever and having a pin extending through the slots in both of said arms, whereby upon moving the lever both of said valves may be simultaneously opened or closed.

2. A blow pipe having two gas conduits, valves mounted in the conduits, each of the valves having a rotatable stem on which there is a slotted arm, a lever pivoted upon the blow pipe, and a link pivoted to the lever and having a pin extending through the slots in both of said arms, whereby upon moving the lever both of said valves may be simultaneously opened or closed, said link being adjustable.

In testimony whereof I have signed my name to this specification.

ANDREW J. EASON.